Nov. 18, 1941.    H. G. WIEST    2,263,324
REVERSIBLE CAPACITOR MOTOR
Filed June 27, 1941

Inventor:
Horace G. Wiest,
by Harry E. Dunham
His Attorney.

Patented Nov. 18, 1941

2,263,324

UNITED STATES PATENT OFFICE 2,263,324

REVERSIBLE CAPACITOR MOTOR

Horace G. Wiest, Nahant, Mass., assignor to General Electric Company, a corporation of New York Application June 27, 1941, Serial No. 400,025

4 Claims. (Cl. 172—278)

My invention relates to reversing motors of the single phase split phase type, and its object is to provide means whereby standard single phase motor installations may be made reversible in a reliable manner.

Single phase split phase motors generally employ an automatic speed responsive switch for cutting out or modifying the starting winding circuit connections as the motor comes up to speed. My invention relates to a reversing arrangement for such motors where, assuming the motor to be operating at full speed in one direction, the reversing switch may be thrown to start immediately reversing the motor without the necessity of waiting for the automatic starting switch to function to reconnect the starting winding for starting conditions. In this respect my invention accomplishes the object of the motor reversing scheme described in United States Patent 2,195,287, March 26, 1940. However, my arrangement has certain advantages over the patented arrangement in that it is more nearly foolproof and the control apparatus employed may be used without change for motors having different sizes and ratings.

The features of my invention which are believed to be novel and patentable will be pointed out in the claims appended hereto. For a better understanding of my invention reference is made in the following description to the accompanying drawing in which Fig. 1 represents a wiring diagram of my motor reversing control system and Fig. 2 illustrates by means of curves how the reversing characteristics may be modified by means of a resistor in the reversing torque circuit.

Figure 1:
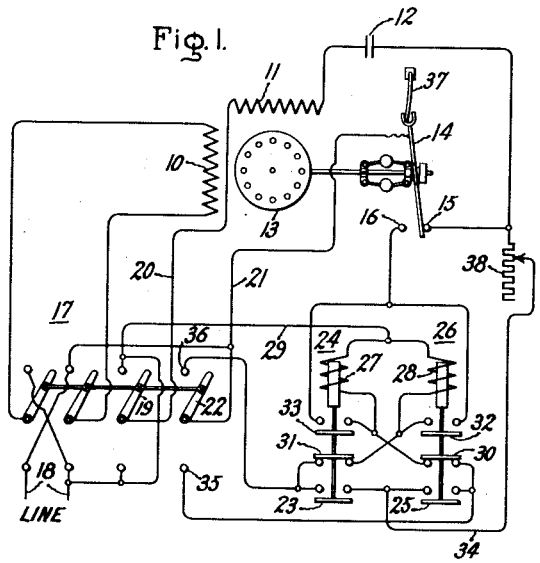
Figure 2:
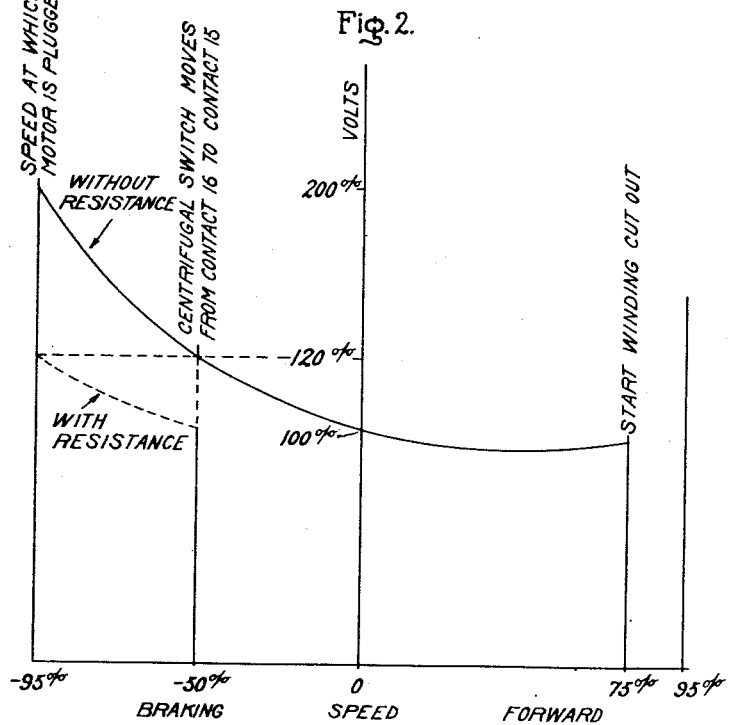

In Fig. 1 of the drawing I have represented a motor of the split phase type having a main or running winding 10, a starting winding 11 with a starting capacitor or other phase splitting device 12 in series therewith and a rotor 13 of the squirrel cage type. The main and starting windings are axially displaced at an angle to each other generally about 90 degrees. 14 represents a two-position speed responsive switch here shown as the centrifugal type having a starting contact 15 and a running contact 16. This switch is used with contact 15 for establishing the starting winding circuit in the usual manner and with running contact 16 to establish relay holding circuits when reversing and before the motor has slowed down to a point where the switch 14 returns to contact 15. At 17 I have shown a manual four-pole double-throw switch which is used to energize the motor from line terminals 18 for opposite direction of rotation. It is seen that the two left-hand sets of contacts of switch 17 are used to energize the main winding 10 and constitute a reversing switch for such winding. For the purposes of this description it will be assumed that when the switch 17 is thrown up, the motor runs clockwise and when the switch is thrown down the motor runs counterclockwise by reason of the reversing of winding 10. The right center sets of contacts of switch 17 controlled by switch blade 19 are for energizing the starting winding circuit 11 of the motor during normal starting operations when switch 14 is in the starting position shown. It will be noted that the switch blade 19 is connected to one end of the starting winding circuit through wire 20 and when this switch blade 19 is closed in either direction it connects wire 20 to the right side of the line 18 because the upper and lower contacts of this group are permanently connected thereto. The normal starting winding circuit is completed through condenser 12 or other phase modifying device, starting contact 15, centrifugal switch 14 and through wire 21 permanently connected to the left side of line 18. This circuit is not reversed by the switch 17.

The extreme right set of contacts of switch 17 controlled by two-way switch blade 22 is for establishing the plugging connection by energizing the starting winding circuit through the contactor 23 of a relay 24 or through the contactor 25 of a relay 26 when the switch 17 is thrown to reverse the motor and when the speed of the motor is above that speed where speed responsive switch 14 rests on the starting contact 15. The function of relays 24 and 26 is to condition or complete the plugging circuit to the stationary contacts of two-way switch 22 in order that such circuit will be closed and energized when switch 17 is reversed and remains energized during the interval between the first instance when plugging is required and the point where the motor speed is reduced to the point where the speed responsive switch 14 drops back to its starting position on contact 15. By plugging is meant the energizing of the motor for a direction of rotation opposite to that in which it is running to obtain quick stopping and reversal.

The relays 24 and 26 have one side of their energizing coils 27 and 28 permanently connected to the right side of line 18 through the wire 29. Relay 24 may have the other side of its coil 27 connected to the left side of line 18 through the contactor 30 of relay 26 when this relay is de-energized and contact 35 and switch blade 22 of switch 17 in the counterclockwise or down position. When relay 24 is so energized, a holding circuit therefor may be established through contact 33 of relay 24, running contact 16 of the speed responsive switch 14, when in running position, and wire 21.

Similarly, relay 26 may have the other side of its coil 28 energized through contactor 31 of relay 24 in the deenergized position, contact 36, and switch blade 22 of switch 17 when in the clockwise or up position and when the relay 26 is energized it establishes its own holding circuit through contactor 32, contact 16, centrifugal switch 14 and wire 21 if the speed responsive switch is in running position. The electrical interlocking of relays 24 and 26 is such that only one can be energized at the same time and one or the other is always energized when switch 17 is closed, depending upon the direction of closure of switch 17. Thus the relays are selectively initially energized through two-way switch 22 and both have holding circuits through the running contact 16 of the speed responsive switch.

When switch 17 is open, all circuits are deenergized as shown. Suppose now switch 17 is closed up for clockwise rotation. Main winding 10 is energized for clockwise rotation. Starting winding 11 is energized through the starting switch 14 on contact 15 and wires 20 and 21 for starting in the usual way and the motor starts. Relay 26 is also energized through contactor 31 of deenergized relay 24 and blade 22 and contact 36 of switch 17. When the motor comes up to speed the speed responsive switch 14 moves from contact 15 to contact 16 and cuts out the starting winding and establishes a holding circuit for relay 26 through contactor 32, contact 16, switch 14 and wire 21. The starting winding is cut out because the connection through wire 34, while closed at contactor 25, is open at contact 35 and while closed at contact 36, is open at contactor 23. If it is merely desired to stop the motor without braking, the switch 17 is opened and relay 26 will drop out as soon as the speed responsive switch 14 moves off of contact 16, but not before.

If it is desired quickly to reverse the motor, switch 17 is thrown from clockwise to counterclockwise position. This reverses main winding 10 and reenergizes starting winding 11 in the same direction as before but through wire 34, contact 25, contact 35 and switch blade 22. A strong braking or plugging action takes place and the motor is quickly reduced in speed to a point where the switch 14 moves back to starting contact 15. Switch 14 is preferably of a type which moves quickly from one stationary contact to the other, as for example, by the use of a spring toggle at 37.

When switch 14 moves off of contact 16, relay 26 is deenergized and drops out, closing contact 30. This energizes relay 24 through contact 35 and switch blade 22, but the starting winding circuit is not closed through contact 23 at this time because this circuit is open at contact 36. The motor, however, is continued to be braked or plugged because now the starting winding is again closed by reason of the fact that switch 14 has returned to the starting position on contact 15. Hence, the motor is quickly brought to a stop and starts in the opposite direction.

At the proper speed in the counterclockwise direction switch 14 moves over to contact 16 and closes the holding circuit of relay 24 through contactor 33. Now throwing switch 17 up will establish the full speed braking or plugging conditions to stop counterclockwise rotation by reason of the starting winding being closed through wire 34, contactor 23, contact 36 and switch blade 22.

It will be evident that the switch 17 may be thrown to either energizing position or open position at any time during any part of the above described operations and the motor will automatically perform the correct operations. For example, suppose the motor is operating at full speed in the clockwise direction and the operator opens the switch 17 intending to reverse the motor but then changes his mind and again closes switch 17 for clockwise operation. If this happens before the motor slows down appreciably, switch 14 will still be on contact 16 and nothing happens except the motor continues to operate in a clockwise direction on the main field only. If it happens after switch 14 moves onto contact 15, the motor accelerates in the clockwise direction again, using the starting winding. Relay 26 will have dropped out but is again energized as soon as switch 17 is closed and locks in as soon as switch 14 moves onto contact 16.

It will be noted that a resistance 38 may be included in the braking circuit which is closed during the initial high speed portion of each braking action. Some resistance may be desirable here to limit the voltage across the capacitance at 12 during the initial braking period where a high voltage capacitance is not available. Also, the magnitude of the initial braking force may be adjusted by using different values of resistance.

The effect of employing the resistance at 38 may be pictured in Fig. 2 where the voltage across the capacitance 12, as ordinates, is compared to the speed as abscissa during a braking and normal accelerating action. When the reversing switch is thrown, the motor being in operation at normal full speed, the motor suddenly becomes connected for the opposite direction of rotation designated "forward" in Fig. 2. The motor speed at this instance may, therefore, be considered as about —95% and is so marked at the left on Fig. 2. The voltage across the capacitance 12 at this speed condition is about 200% of what would exist across the same for a normal starting operation. This voltage, shown by the full line upper curve, decreases to about 120% at —50% speed where the centrifugal switch recloses on contact 15. At zero speed this voltage is the normal or 100% voltage. As the motor reverses and increases in speed in the forward direction the voltage across the capacitance dips very slightly and is about normal where the starting winding circuit is cut out by the centrifugal switch at about 75% speed and then drops to zero. If sufficient resistance were included at 38 to reduce the voltage across the capacitance to 120% normal at —95% speed, the voltage across the condenser would be represented by the lower dotted line curve between —95% and —50% speeds.

When the resistance is cut out at —50% speed, by movement of switch 14 from contact 16 to contact 15, the voltage across the condenser rises to the full line curve value. It is seen that a resistance at 37 may be desirable in reducing the voltage across the condenser or in reducing the magnitude of the braking torque or both. The dotted line voltage curve may be raised or lowered by decreasing or increasing the resistance at 38. The use of such resistance to control the braking torque has no influence on the starting torque conditions because that portion of the circuit through resistor 38 is not used during the starting portion of the cycle. The circuits and the conditions are symmetrical for both directions of motor operation.

It will be seen that the operation of relays 24 and 26 does not depend upon the voltage conditions of the motor or capacitor but they are energized from line 18 so that the equipment comprising switch 17 and the relays 24 and 26 may be made standard for use on motors having various different characteristics and values of capacitance or for resistance or reactance split phase motors.

In accordance with the provisions of the patent statutes, I have described the principle of operation of my invention together with the apparatus which I now consider to represent the best embodiment thereof, but I desire to have it understood that the apparatus shown is only illustrated and that the invention may be carried out by other means.

What I claim as new and desire to secure by Letters Patent of the United States is:

1. A split phase reversing motor having main and starting windings, connections for energizing said windings in parallel circuits including a reversing switch by means of which the main winding may be reversed and energized for either direction of rotation, a speed responsive switch for opening the starting winding circuit when the motor comes up to speed and also having a running contact, and means for energizing the starting winding circuit when the speed responsive switch is on its running contact and the reversing switch is thrown to reverse the motor, whereby plugging action is obtained, including a two-way plugging circuit energizing switch operated with said reversing switch, a pair of relays, interlocked so that only one may be energized at a time, and both having holding circuits through the running contact of the speed responsive switch, one relay being initially energized through said two-way switch during clockwise motor operation and when energized completing the plugging circuit thereto for reversing in the opposite direction, and the other relay being initially energized through said two-way switch during counterclockwise operation and when energized completing the plugging circuit thereto for reversing in the opposite direction, whereby when said reversing switch is operated to reverse the motor the starting winding plugging circuit is energized.

2. A split phase reversing motor having main and start windings, connections including a four-pole double-throw switch having two blades for energizing and reversing the main winding and a blade for energizing the start winding for connecting said windings in parallel circuits for normal motor operation in opposite directions of rotation, a speed responsive switch for opening the starting winding circuit as the motor comes up to speed, said switch also having a running contact and means for establishing a plugging circuit through the starting winding when the speed responsive switch is on its running contact and the reversing switch is thrown to reverse the motor, whereby plugging action is obtained, including a fourth blade on said reversing switch for energizing such plugging circuit, and a pair of relays selectively alternately initially energized through said fourth blade, interlocked so that only one is energized at a time and both having a holding circuit through said running contact, one relay having contacts which, when the relay is energized, conditions such plugging circuit for one direction of motor operation and the other relay having contacts which, when such relay is energized, conditions such plugging circuit for the opposite direction of motor operation.

3. A split phase motor of the type having main and starting windings and a speed responsive device for disconnecting the starting winding when the motor comes up to speed, connections for operating said motor in opposite directions of rotation and reversing the same by plugging comprising a four-pole double-throw switch having two closed positions designated C. W. and C. C. W., two poles of the switch being connected to reversely energize the main winding for C. W. and C. C. W. positions of said switch, the third pole being connected to energize the starting winding through the speed responsive disconnecting device for both positions of said switch and the fourth pole being connected to establish alternate motor plugging connections through the start winding in parallel with the speed responsive switch for the two positions of said switch, a relay initially energized through said fourth pole when in the C. W. position for completing the plugging circuit when said switch is in C. C. W. position, a relay initially energized through said fourth pole when in the C. C. W. position for completing the plugging circuit when said switch is in C. W. position, a holding circuit for both of said relays which is established by the speed responsive device only when in position to disconnect the starting winding, and an electrical interlock between said relays whereby only one may be energized at the same time.

4. A reversible split phase motor having main and start windings, a phase splitting device in the starting winding circuit, a speed responsive device and a switch operated thereby for opening the starting winding circuit when the motor comes up to speed and reclosing said circuit again as the motor speed is reduced in stopping, circuit control means for energizing the motor and reversing the main winding for operation in opposite directions of rotation, means for establishing a plugging circuit through the start winding and phase splitting device when said controller is operated to reverse the motor and while the starting winding switch is open, and a current limiting resistance included in said plugging circuit which is excluded from the starting winding circuit when the starting winding switch is closed.

HORACE G. WIEST.